(12) United States Patent
Helgi

(10) Patent No.: US 7,967,149 B2
(45) Date of Patent: Jun. 28, 2011

(54) APPARATUS AND METHOD FOR GRADING ARTICLES BASED ON WEIGHT, AND ADAPTED COMPUTER PROGRAM PRODUCT AND COMPUTER READABLE MEDIA

(75) Inventor: Hjálmarsson Helgi, Kopavogur (IS)

(73) Assignee: Valka EHF (IS)

( * ) Notice: Subject to any disclaimer, the term of this patent is extended or adjusted under 35 U.S.C. 154(b) by 192 days.

(21) Appl. No.: 12/161,863

(22) PCT Filed: Jan. 23, 2007

(86) PCT No.: PCT/IS2007/000004
§ 371 (c)(1),
(2), (4) Date: Jul. 23, 2008

(87) PCT Pub. No.: WO2007/083327
PCT Pub. Date: Jul. 26, 2007

(65) Prior Publication Data
US 2009/0026119 A1    Jan. 29, 2009

Related U.S. Application Data

(60) Provisional application No. 60/816,290, filed on Jun. 23, 2006.

(30) Foreign Application Priority Data

Jan. 23, 2006    (IS) ............................................. 8260

(51) Int. Cl.
*B07C 5/16* (2006.01)
*B07C 5/00* (2006.01)

(52) U.S. Cl. ......... 209/592; 209/552; 209/645; 209/912
(58) Field of Classification Search .................. 209/592, 209/645, 646, 648–650, 942, 552, 912; 177/145
See application file for complete search history.

(56) References Cited

U.S. PATENT DOCUMENTS

| | | | | |
|---|---|---|---|---|
| 1,706,734 A | * | 3/1929 | Hughes | 209/646 |
| 4,310,276 A | | 1/1982 | Castagnoli | |
| 4,428,179 A | * | 1/1984 | Jordan et al. | 53/502 |
| 4,720,961 A | * | 1/1988 | Jordan | 53/502 |
| 4,758,778 A | * | 7/1988 | Kristinsson | 324/692 |
| 4,870,799 A | * | 10/1989 | Bergerioux et al. | 53/55 |
| 5,813,195 A | * | 9/1998 | Nielsen et al. | 53/443 |
| 6,126,017 A | | 10/2000 | Hours | |
| 6,787,712 B2 | * | 9/2004 | Asai et al. | 177/25.18 |

(Continued)

FOREIGN PATENT DOCUMENTS

WO    0110574 A    2/2001

*Primary Examiner* — Joseph C Rodriguez
(74) *Attorney, Agent, or Firm* — Brooks Kushman P.C.

(57) ABSTRACT

This invention relates to an apparatus for grading food articles by building up portions based on at least one characteristic, e.g. number of food articles, or weight of food articles. A first conveyor conveys the articles along a closed-loop conveying path, where the conveyor has a number of article holders attached to the conveyor for holding and preserving the initial position of the food articles during the conveying. The exact position of the food articles in the article holders is determined. A processor in a combination with a removing means uses this exact position to control the releasing of the food articles from the article holders into pre-fixed locations the containers and in that way controls the location of the food articles in the containers.

27 Claims, 9 Drawing Sheets

U.S. PATENT DOCUMENTS

| | | | |
|---|---|---|---|
| 6,955,031 B2 * | 10/2005 | Doake et al. | 53/502 |
| 7,258,237 B2 * | 8/2007 | Nielsen | 209/645 |
| 7,368,670 B2 * | 5/2008 | Hjalmarsson | 177/25.18 |
| 2009/0216368 A1 * | 8/2009 | Thorsson | 700/219 |

* cited by examiner

APPARATUS AND METHOD FOR GRADING ARTICLES BASED ON WEIGHT, AND ADAPTED COMPUTER PROGRAM PRODUCT AND COMPUTER READABLE MEDIA

CROSS-REFERENCE TO RELATED APPLICATION

This application is the U.S. national phase of PCT Appln. No. PCT/IS2007/000004 filed Jan. 23, 2007 which claims priority to Iceland application IS 8260 filed Jan. 23, 2006. This application also claims the benefit of U.S. provisional application Ser. No. 60/816,290 filed Jun. 23, 2006.

FIELD OF THE INVENTION

The present invention relates to an apparatus and a method for grading articles based on at least one characteristics of the articles, wherein the grading comprises building up portions of the articles in containers or grading the articles onto one or more receiving areas, wherein the arrangement of the articles during the grading is preserved.

BACKGROUND OF THE INVENTION

In the last years, some progress has been made in the development of equipment for the packaging of fresh food products.

EP 1226408 discloses weighing and portioning techniques bases on grader technique, where a number of items which are to be portioned out, namely natural foodstuff items with varying weight, are subjected to a weighing-in and are thereafter selectively fed together in a computer controlled manner. According to this reference, a transport equipment of a robotic type having an associated control unit is used for arranging the allocation of the individual items to respective receiving stations for items for the different groups, and for the related selective control of the transport equipment. In one embodiment a carton packing is placed for thereby enabling a direct packaging.

Similar disclosure but for poultry packaging may be found in "Robotic Packaging of Poultry products, by K. Khodabandehloo, Department of Mechanical Engineering, University of Bristol ISBN 0442316615 (Routledge, 1992)" and "Benefits of Experts robots intelligence vs. Skill, by K. Khodabandehloo, Department of Mechanical Engineering, University of Bristol ISBN 0387537317 (Routledge, 1992)". There, a robotisation is disclosed for placing poultry portions in trays according to a defined scheme with a requirement of minimum overweight in the trays.

The disadvantage with the above references is that in order to obtain portions with a minimum overweight it is necessary to have a large amount of containers, e.g. trays, boxes etc. As an example, in an extreme situation that there are two containers that are to be filled simultaneously, the robotic system does have a very limited choice when generating these portions. Another disadvantage in these references is that a large number of containers requires a large space area. This can result in that the robotic systems but be adapted to the large space, e.g. with long transport arms, but as the robot arms are longer the fewer articles per minute they can displace. Another option is to use more robot arms but that will result in significantly higher costs. Furthermore, this means that in an extreme situation that 50 containers are to be filled, one would obviously need a number of robots to perform the operation described in these references.

Another disadvantage of having robot arm picking the articles up from a conveyor is that it is difficult to design a good gripper arm to handle, e.g. grasping, delicate food products which typically come in various sizes. If the gripper arm is big enough for the biggest articles it will require significantly more space between small articles than would otherwise be needed.

BRIEF DESCRIPTION OF THE INVENTION

The object of the present invention is to therefore to overcome the above mentioned disadvantages by providing an apparatus and a method that are capable of generation portions based on at least one characteristics, e.g. weight determined portions, where the arrangement off the articles in the containers is such that a minimum space is required.

According to one aspect, the present invention relates to an apparatus for grading articles based on at least one characteristics of the articles, wherein the grading comprises building up portions of the articles in containers or grading the articles onto one or more receiving areas, wherein the arrangement of the articles during the grading is preserved, comprising:
  determining means for determining one or more characteristic parameters indicating the characteristics of the articles,
  a first conveyor for conveying the articles along a closed-loop conveying path, the conveyor comprising a number of article holders attached to the conveyor for holding the articles during the conveying along the closed-loop conveying path,
  arranging means for arranging the articles onto the article holders, the article holders being adapted to preserve the arrangement of the articles in the article holders during the conveying,
  a processor for using the one or more characteristic parameters for selecting article holders suitable for the grading, and
  removing means for removing the articles from the article holders in the containers or to the one or more receiving areas.

Thereby, an apparatus is provided that requires much less space compared to prior art apparatuses, is more economical and since the apparatus does not require grasping that articles it is capable of handling all kinds of articles including sticky delicate foot articles such as fish, fish fillets, fish fillet parts of variable size and shapes. Further, the first conveyor has the function of article "storage" having with the articles e.g. resting on the article holder wherein the number of articles being stored is manly based on the number of article holders (and the amount of articles on each article holder). The result is that the apparatus is capable of building up only one or few portions into the containers, and/or grading the articles onto one or more receiving areas based on the characteristic properties of the articles, wherein the arrangement of the articles is preserved throughout the whole grading process. Those articles that are not suited at a given time can be fully automatically re-circulated and used at a later time. This means that articles will never be rejected but recycled back into the system. As an example, if the number of article holders is 100, it is possible to have 100 articles, or group of articles, running simultaneously. These 100 articles are therefore possible candidates to be used for building up the portions. Therefore, it is possible to fill only one box at a time and simultaneously obtain e.g. a minimum overweight and the best possible arrangement of the articles in the containers, without having to reject any of the articles. Those articles that are at one instant of time not suitable for any container, e.g. this one container, are simply conveyed along the closed loop conveying path until later or for the subsequent container. In that way, one and the same article can be conveyed more than one, e.g. 10, 20, 30 "cycles" until it will be used. Another important advantage obtained by the present invention is that the precise arrangement of the articles in the conveyor is preserved. As an example, if the article is a salmon fillet situated across in an article holder with e.g. skin facing down, precisely this position will be preserved when the article is in a container. The arranging means may comprise manual arrangement performed by an operator, or automatic arrangement. With the term container in the present invention is meant any type of tray, box, and the like which may be used as "end package" for the product. The term container in the present invention can also comprise a bin. Also, with the term portions is meant one or more articles arranged in the container fulfilling one or more characteristics. As an example, a portion can comprise 10 articles of red articles arranged in a container. A portion can also comprise a weight determined portion, e.g. 10 kg of fish fillet in a tray. The article can comprise any kind of fresh food article, such as whole fish, fish fillet, meat fillet, poultry fillet, poultry parts and the like. The articles can of course also include any type of non-food articles.

In an embodiment, the determining means comprises a weight determining means, and wherein the characteristic parameters indicating the characteristics of the articles is the weight of the articles. In that way, the grading is based on the weight of the articles and e.g. the portions of articles preferably comprise weight determined portions. The weight determining means can e.g. be based on computer vision, or comprise a dynamic or static weighing scales. The weighing process may be performed prior to arranging the articles onto the article holders, or on the article holder, e.g. be integrated into the holder.

In an embodiment, the arranging means for arranging is further adapted to arrange a part of the articles directly into the containers prior to the release of the articles from the articles holders into the containers. Therefore, if e.g. the portions comprise weight determined portions, it might be preferred to fill the containers up to a first weight limit and use the articles on the first conveyor for finishing the weight determined portions.

In an embodiment, the arranging means comprises one or more a robotic systems. In that way, the arrangement will be fully atomized and very effective. The robotic system may be adapted to determine the initial arrangement of the articles e.g. using computer vision and based thereon displace the articles, and eventually rotate so that a preferred arrangement on the article holders is obtained. The computer vision may also of course be a separate unit from the robotic system.

In an embodiment, the first conveyor comprises one or more carousel conveyors. The carousel conveyors can have joint or separate driving mechanisms. The article holders can also be separated or joint. When multiple carousels are used the article holder on each carousel can preferably be released independently of one another.

In an embodiment, the apparatus further comprises an in-feed conveyor for in-feeding the articles. Therefore, the articles prior to the weighing may be conveyed as a sequence of articles which may facilitate the arrangement of the articles onto the article holders (after the weighing).

In an embodiment, the carousel conveyor is situated vertically in relation to the in-feed conveyor rotating along a circular path with rotational axis being substantially in the horizontal plane as the in-feed conveyor.

In one embodiment, the weight determining means is a grid-scale comprising a number of substantially horizontally and parallel extending rods, the arrangement of the grid-scale being such that it overlaps the closed-loop conveying path of the first conveyor. In another embodiment, the article holders comprise shovel-shaped grids comprising a number of substantially horizontally and parallel extending rods, wherein in an overlap position between the grid-scale and the shovel shaped grids the rods of the shovel-shaped grids fall within the space between two adjacent rods in the grid-scale, thereby enabling the shovel-shaped grids when approaching the grid-scale from below to go through the grid-scale. This provides therefore a very effective way of removing the articles from the grid-scale onto the article holders by "shovel up" the articles up from the grid-scale, where simultaneously the initial arrangement of the articles on the grid-scale is preserved.

In an embodiment, the article holders are further associated to a displacement mechanism for enabling side-wise displacement of each holder in relation to the closed-loop conveying path. This can be of particular advantage, especially considering the previous embodiment, since if the article holder already has an article it is clearly preferred when passing the grid-scale not to remove the article resting on the grid scale by moving aside and away from the grid-scale. In that way, the article holder will not go through the scale. The article holder can also be equipped with mechanism to push the articles out of the article holders at the desired location. Furthermore, there can be mechanism in the article holders to secure the articles in the articles holder such that the articles will not get shifted even though the article holders are moving at high speed.

In one embodiment, the apparatus further comprises at least one second conveyor for conveying the containers during building up the portions, the at least a second conveyor comprising a first filling conveying section arranged below the first conveyor where the releasing of the articles from the article holders into the containers takes place. In another embodiment, the second conveyor further comprises a second filling conveying section where arranging a part of the articles directly into the containers prior to the release of the articles from the articles holders into the containers takes place. Preferably, the second conveyor further comprises an encoder for keeping track of the position of the containers. This means that the conveying of the containers is fully automatic, where e.g. after obtaining the target weight, each container will be conveyed automatically to the fine filling conveying section, where the fine filling takes place.

In an embodiment, the at least one second conveyor comprises is adapted to move in forward and backward direction substantially perpendicular to the conveying path of the first conveyor, wherein the conveyors are further adapted to control the position of the containers during building up the portions of the articles in containers. In that way, the at least one second conveyor can be utilized to control the position of the articles in the containers and also to control which containers at each time point should receive the articles from the removing means. As an example, container 1 could include two rows of articles, wherein the conveyor that conveys container 1 displaces the container during building up the portions, e.g. in a forward and/or backward direction such that two (or more) rows of articles will be build up. Also, during building up the portions the at least one second conveyor is adapted to determine which container at each time point should receive the article. It follows that this article receiving section is enormous space saving. If we assume that the length of the at least one second conveyor is such that it can carry 3 containers simultaneously and that 9 containers are needed for the grading, only three second conveyors are needed.

In an embodiment, the at least one second conveyor comprise a receiving end for receiving empty or partly filled containers and a returning end for returning filled up containers, wherein the sequence of filling up the containers is such that those containers the facing the returning end are those where the portions are first build up. In that way, it is ensured that empty or half filled containers don't block those containers that have been filled up.

In an embodiment the containers in the initial filling locations are sitting on a static scale which records the weight of the articles which have been placed in the container and can thus determine when the initial filling limit has been reached.

In an embodiment the containers in the final filling locations are sitting on a static scale which can be used to check-weigh the container after the final article has been placed in the container. If the weight is under the desired target weight more articles can be placed in the container to ensure that under-weight containers will not be released.

In an embodiment, the apparatus further comprises an in-feed conveyor for conveying incoming articles prior to the weighing. In that way, the articles can be fed as a discrete stream of articles from e.g. a pile of articles and preferably form a stream of discrete articles.

In an embodiment, the displacing means comprises an angular variation mechanism associated to each respective article holders, wherein the releasing comprises altering the angular position of the article holder resulting in a sliding of the articles from the article holders into the containers.

In an embodiment, the displacing means comprises a robotic system or an articles release robotic system. In that way, the process of displacing the articles from the articles holders into the containers is without altering the arrangement of the articles in the article holders will be very effective and precise.

In an embodiment, wherein the apparatus further comprises a weighing means for weighing each of the containers prior to building up weight determined portions of the articles of a final weight limit in the containers, wherein the result of the weighing by the weighing means is used as an reference or zero weight limit for each of the weight determined portions, wherein during building up the weight determined portions in each of the containers the total weight of each of the portions is frequently measured by the weighing means and compared to the sum up weight of each of the articles in each of the containers, wherein building up each of the portions comprises releasing the articles into the containers until the total weight of each of the portions has reached final weight limit.

In that way, variations of the container weights is eliminated. It should be noted that the weight of such containers can be relative different. By weighing the containers first and used the weight as e.g. zero weight limit, one uncertainty factor is the weight determined portions is eliminated. Also, by monitoring the weight of the portions (e.g. by subtracting the weight of the empty container) the actual weight of each of the portions can be monitored and compared to the weight that "should" be there or the estimated weight. It will therefore be ensured that the requested final weight limit will be obtained in each of the containers.

According to another aspect, the present invention relates to a computer program product being adapted to enable a computer system comprising at least one computer having data storage means associated therewith to control the apparatus in accordance to any of the preceding claims.

According to yet another aspect, the present invention relates to a method of grading articles based on at least one characteristics of the articles, wherein the grading comprises building up portions of the articles in containers or grading the articles onto one or more receiving areas, wherein the arrangement of the articles during the grading is preserved, comprising:
   determining one or more characteristic parameters indicating the characteristics of the articles,
   conveying the articles along a closed-loop conveying path, the conveyor comprising a number of article holders attached to the conveyor for holding the articles during the conveying along the closed-loop conveying path,
   arranging the articles onto the article holders, the article holders being adapted to preserve the arrangement of the articles in the article holders during the conveying,
   using the one or more characteristic parameters for selecting article holders suitable for the grading, and
removing the articles from the article holders in the containers or to the one or more receiving areas.

In an embodiment, determining one or more characteristic parameters comprises determining the weight of the articles and wherein the portions comprise weight-determined portions, the method further comprising arranging the articles directly into the containers up to a first weight limit and subsequently conveying the containers towards the conveyer where the releasing from the article holders into the containers takes place until a final weight limit is reached. This will make the method, when implemented to make weight-determined portions, more effective where e.g. the weight portions are significantly larger that the average weight of the articles. As an example, if the weight portions to be generated are 10 kg, but the average weight of the articles is 50 g, it will clearly be more effective to fill the containers up to e.g. 9000 g, and use the weighed articles that are conveyed in the closed-loop conveying path for final filling.

In an embodiment, the first weight limit is selected so that the difference between the weight-determined portions and the final weight limit corresponds substantially to an integer multiplication of an average weight of each individual subject. Referring to the above mentioned example where 10 kg weight portions are to be determined, by selecting the initial weight limit as 9900 g, where the average weight of the articles is 50, it will clearly be preferred to leave a gap that is integer multiplication of an average weight of each individual subject, i.e. 2*50 g. The result will be higher accuracy in the portions and minimum overweight (give-away).

In an embodiment, the portions comprise two or more different types of articles or two or more different weight portions. In that way, the apparatus can e.g. be used to generate several weight portions simultaneously, which can be preferred in cases where the weight of the articles varies much. This will typically result in more article holders in the first conveyor as the final filling of a given container can only be selected from articles of the appropriate type. In other instances each container can be required to be filled with a given number or a given weight of multiple types. For example 3 articles of type 1 and 400 g of type 2, 1-3 articles of type 3 while the total weight should be 1000 g with minimum give-away.

In an embodiment, controlling the arrangement of the articles comprises preserving the initial plane direction and the initial orientation of the articles from where the articles are arranged in a pre-defined way onto the article holders until the articles have been released into containers or to the one or more receiving areas. In that way, the arrangement of the articles will be much more affective.

In an embodiment, the articles are arranged automatically onto the article holders. This can, as mentioned earlier, include using a robot for displacing the incoming articles onto the article holders, which makes the initial displacement more accurate. Of course, the articles might be arranged manually by an operator onto the article holder.

In one embodiment, the step of displacing the articles from the article holders into the containers or to the one or more receiving areas without altering the arrangement of the articles in the article holders is performed by altering the initial angle position of the article holders until the articles slide therefrom to the containers. In another embodiment, the step of displacing the articles from the article holders into containers or to the one or more receiving areas without altering the arrangement of the articles in the article holders is performed by removing the articles automatically therefrom to the containers.

According to still another aspect, the present invention relates to a computer readable media adapted to store instructions for executing the above mentioned method steps.

It should, however, be noted that the invention can also be used for feeding, transporting and batching non-sticky products.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
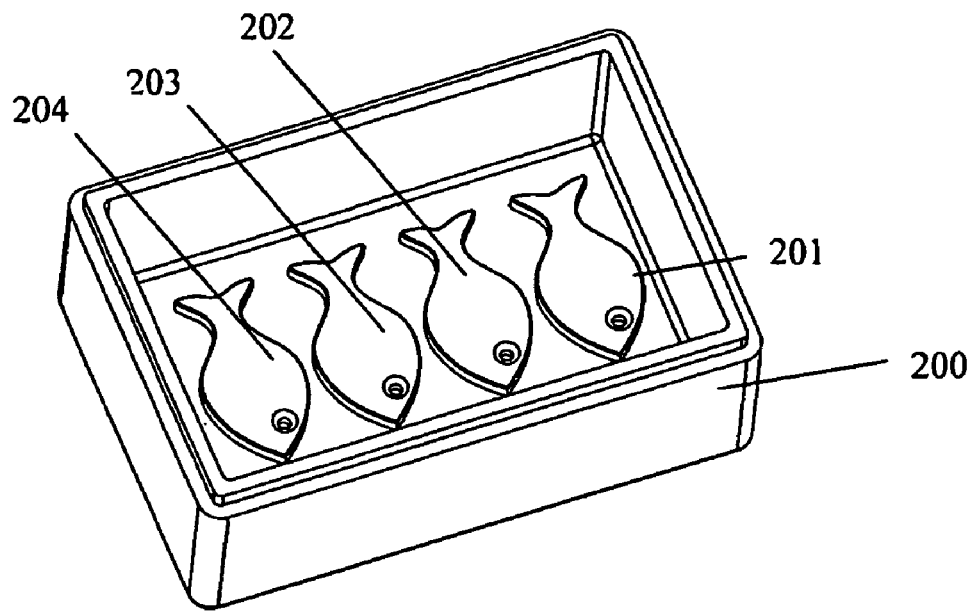
FIGS. 1 and 2 shows a container with properly placed articles, FIG. 3. Shows a perspective view of one embodiment the batching and grading apparatus, FIG. 4. Shows a side view of the same embodiment as shown in FIG. 3, FIG. 5. Shows a detailed view of the same embodiment as shown in FIG. 3 which is focused on a particular in-feeding method, FIG. 6. a, b, c. show an embodiment of the article holder in three different configurations, FIG. 7. Shows another embodiment of an article holder and how articles can be displaced from the article holder into a container, FIG. 8. Shows an embodiment including how containers are fed to and from the system
Figure 2:
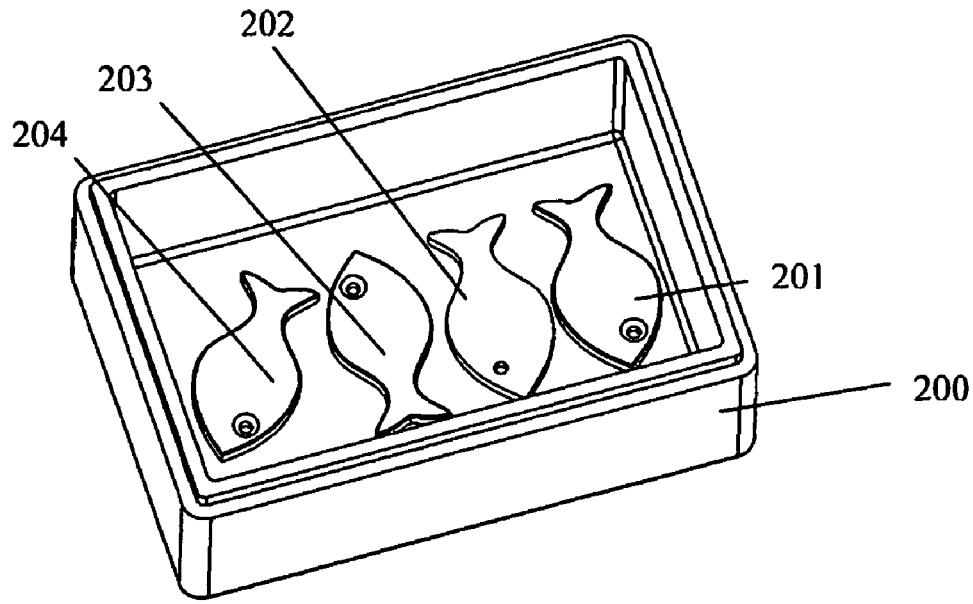

FIGS. 1 and 2 shows a container with properly placed articles. In FIG. 1 the articles, e.g. a whole fish or fish fillets 201-204, have been placed into containers 200 in precisely the same way. In this particular case, it matters that the "correct" side, i.e. as e.g. requested by the buyer, is facing up—in this case the one with round edges—and it matters that the longitudinal axis of the articles are along the shorter side of the container. In FIG. 2. the articles 201-204 are not placed in the same way as shown in FIG. 1. The only article correctly placed is the furthest fish to the right 201, the second one 202 is flipped upside down, the second one 203 has been rotated 180° along an axis pointing upwards while the furthest on the left has been rotated about 30° around the same axis. One important subject according to the present invention is to manage the position of the articles into e.g. such containers.

Figure 3:
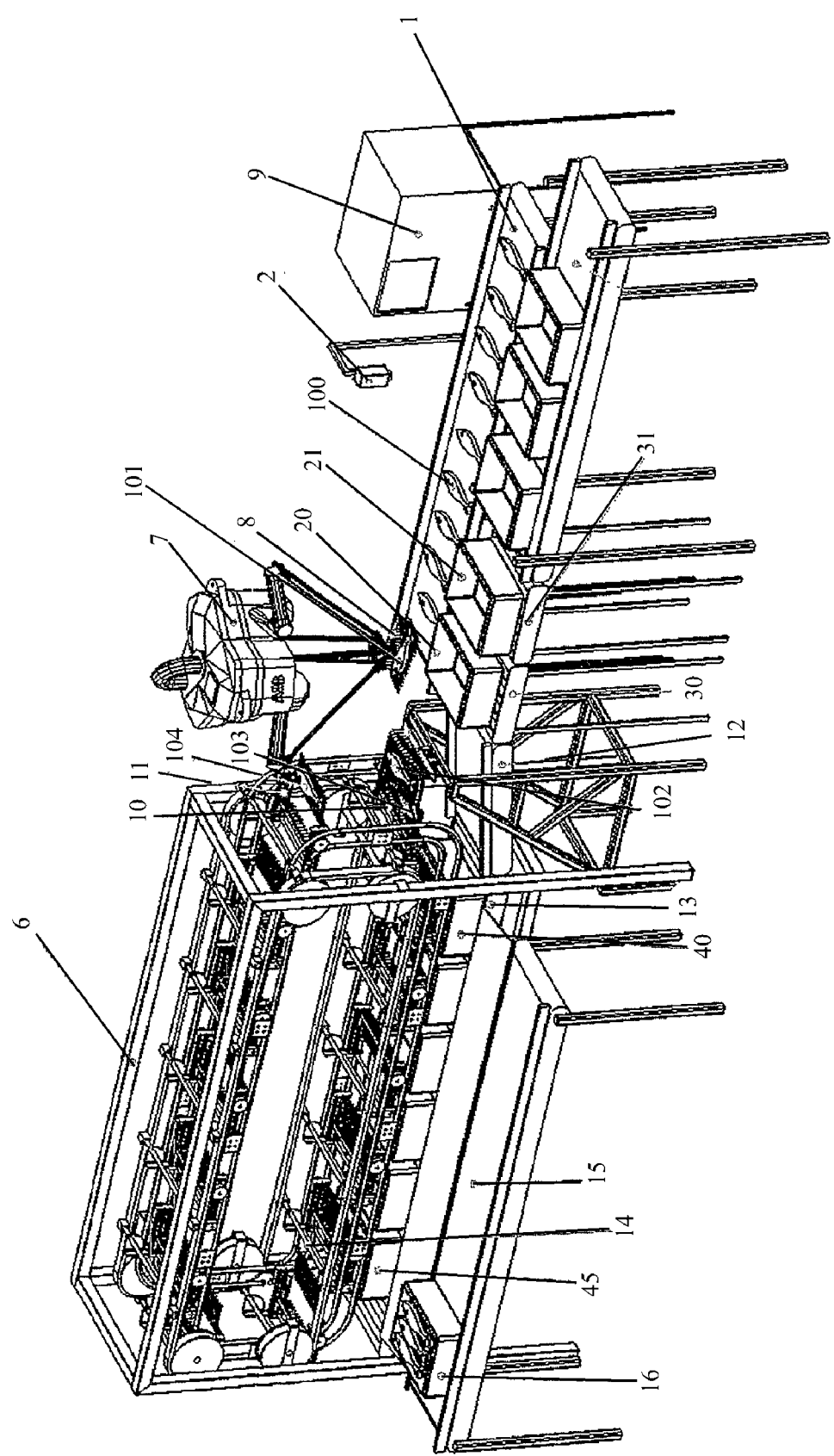
Figure 4:
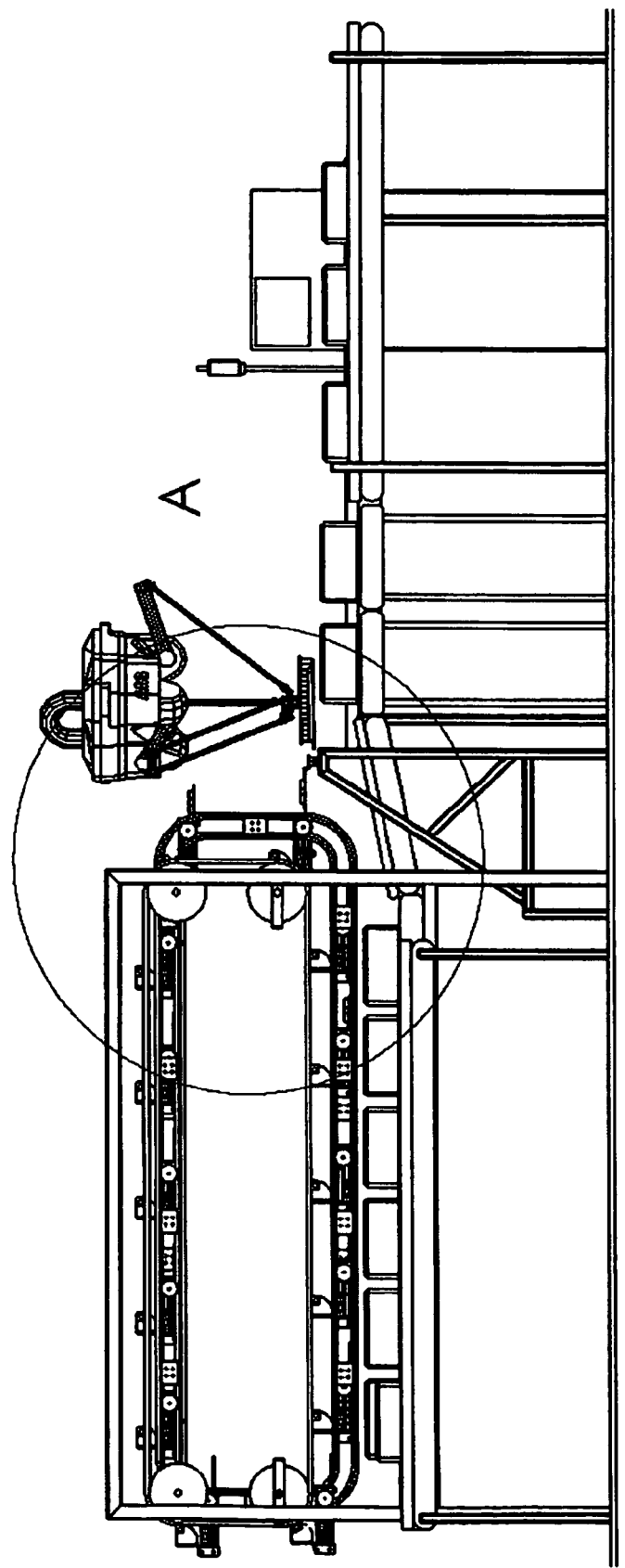

FIGS. 3-4 show a perspective view of one embodiment of the batching and grading apparatus, and a side view of the same embodiment is shown in FIG. 3. Shown is an in-feed conveyor 1 where the articles 100 are placed with the preferred side upwards and in the configuration—most commonly completely flat—which is preferred in the container 20-21 or 40-45 in which the product 100 is to be packed. It is possible to have rims on this conveyor 1 to make it easier to pick up the product 100 from the conveyor 1 with a rim-gripper 8. A robot 7 with a suction gripper or a rim gripper 8 as shown on FIG. 3 is used to pick up the product from the in-feed conveyor 1 which either places the article on the weighing means which in this embodiment is a rim-scale 3 or in one of the containers 20, 21 or 22. The weighing means can also comprise a static and/or dynamic scale, or even a computer vision where e.g. based on the contour and/or the height profile of the articles the weight is determined. The robot 7 holding the rim gripper 8 can either be at the end of the in-feed conveyor or there can be rims in the conveyor to facilitate the pick-up of the articles. Another alternative is to have the in-feed conveyor 1 made of multiple cords, typically round, and then the gripper can go between the cords to pick up the article. To be able to determine the precise time and location to pick up the article from the in-feed conveyor 1a camera 2 is used to record the location of the individual articles 100—note that an article can either mean a single article or a group of articles which are treated as a single article in the system. A series of articles 100, in this case fishes, are shown on the in-feed conveyor 1, e.g. article labeled 11 which has passed the camera and has therefore a recorded location. The camera 2 is connected to the control system 9 which receives as well as the precise location of the individual articles and a weight estimate of the article which can either be calculated from the projected area of the article or from a volumetric measurement of the article. It is also possible to have a separate, dynamic or static scale, to measure the weight more precisely but typically that will not be needed at this stage in the process. The in-feed conveyor 1 has an encoder (not shown on figure) or a compatible device which is used to track precisely the movement of the conveyor belt. In some instances it is possible that the camera is used to detect which side of the product 100 is facing upwards and then the robot arm can be used to turn the article around if another orientation is preferred in the containers. When an article 102 has been placed onto the rim-scale 3 and the precise weight has been recorded and reported to the central computer, it is picked up by the next empty article holder 10 in a first conveyor that conveys the articles along a closed-loop conveying path. As shown in this embodiment, this first conveyor is a carousel conveyor 6. Initially the system seeks to fill up the carousel conveyor to have the maximum amount of selections to make when finishing a container. The system can either put a single article or multiple articles on the rim-scale 3 at the same time, if multiple articles are placed on the rim-scale they are weighed together, their number is recorded and reported to the control system. Those articles will then typically go into the same container although that is not required. If the robot 7 has more capacity than the rim-scale there can be multiple rim-scales 3 which feed each carousel conveyor. Article holder 11 has already picked up the article 104 on the rim-scale and the precise weight of that article is therefore known as well as on all articles which have entered the carousel. This will ensure that very high weighing accuracy can be obtained. In other embodiments where less accuracy is needed the carousel can be equipped with dynamic weighing means (not shown in Figure). When determining in which container a article is fed the main objective is to fill the first container 20 to a particular target or first weight, called the initial-fill target (or first weight limit). The initial-fill target is determined with the aim of maximizing the change of completing the batch with minimum give-away with the articles currently in the carousel. To avoid overshooting the initial-fill target articles can be placed in any of the following containers, 21, 22, where 21 has the highest priority. The number of containers that can be filled simultaneously depends on the reach of the robot arm if there is a single robot arm. In some instances there can be multiple robot arms used to feed the containers and the rim-scales. Typically the first robot would then be used to feed the rim-scales and the following robots would feed the containers. To ensure accurate measurement of the weight in the containers being filled, they are on weighing means 30-32 which here are static scales, container 20 sits on scale 30, 21 is on scale 31 e.t.c. The weight measurement from the scale 30 is continuously used to measure the weight in the container and thus the measurement is not dependent upon the weight estimate from the vision system 2. When the final pre-fill article has been placed in the container to be completed next 20, the system waits for the precise weight and the rollers between the rims on the scale 30 are then lifted up and the container is moved of the scale to the transfer conveyor 12 onto the roller conveyor 13 to any of the release location underneath the carousel conveyor 6. At the same time an algorithm running in the control system 9 determines which articles in the carousel 6 are best suited to complete the filling of the container 20 with minimum give-away. Various algorithms can be used for this task and they can have various objectives. In one embodiment the main objective is to minimize the average give-away in all containers being filled but there can be other objectives that need to be met as well at the same time; e.g. number of articles of particular type, e.g. colors, shape, in a container e.t.c. As the carousel 6 runs continuously the articles needed to complete the filling of the container will pass the container. It is not necessary that a filling of a particular container can be fully determined with the articles in the carousel right after the initial filling for example if their weight of the articles in the carousel is not sufficient to fill the container to the desired target weight. The container 20 will be placed in such a manner in the release location that the release mechanism (not shown on figure) can release the articles to be released exactly at the correct place in the container. Previously when the robot arm 7 placed the article on the rim scale 3 it was ensured that it was in the correct orientation such that it would release correctly into the containers. In some instances when there is a complicated requirement on fitting the article into the container, e.g. if working with L-shaped articles like whole chicken legs, there could be a receiver mechanism (not shown on Figures) above the boxes to be filled (e.g. box 40) which will ensure proper orientation when releasing the articles into the box. In other instances when working with elongated articles, as shown in the preferred embodiment, no such mechanism is needed. Another option is to have another robot arm for example at the other end of the carousel which will pick the articles of the carousel and it can then place them in one of the containers which it could choose from. When the final article has been released into a container it is pushed of the roller conveyor 13 onto the take-away conveyor 15—where a full container 16 is located—and typically from that conveyor onto a check-weighing scale (not shown on figure) to ensure that the final weight is accurate.

It should be noted that although pre-filling up to a first weight limit is shown in this embodiment is not needed in all cases and can be omitted without any other parts of the process needed to be altered.

Figure 5:
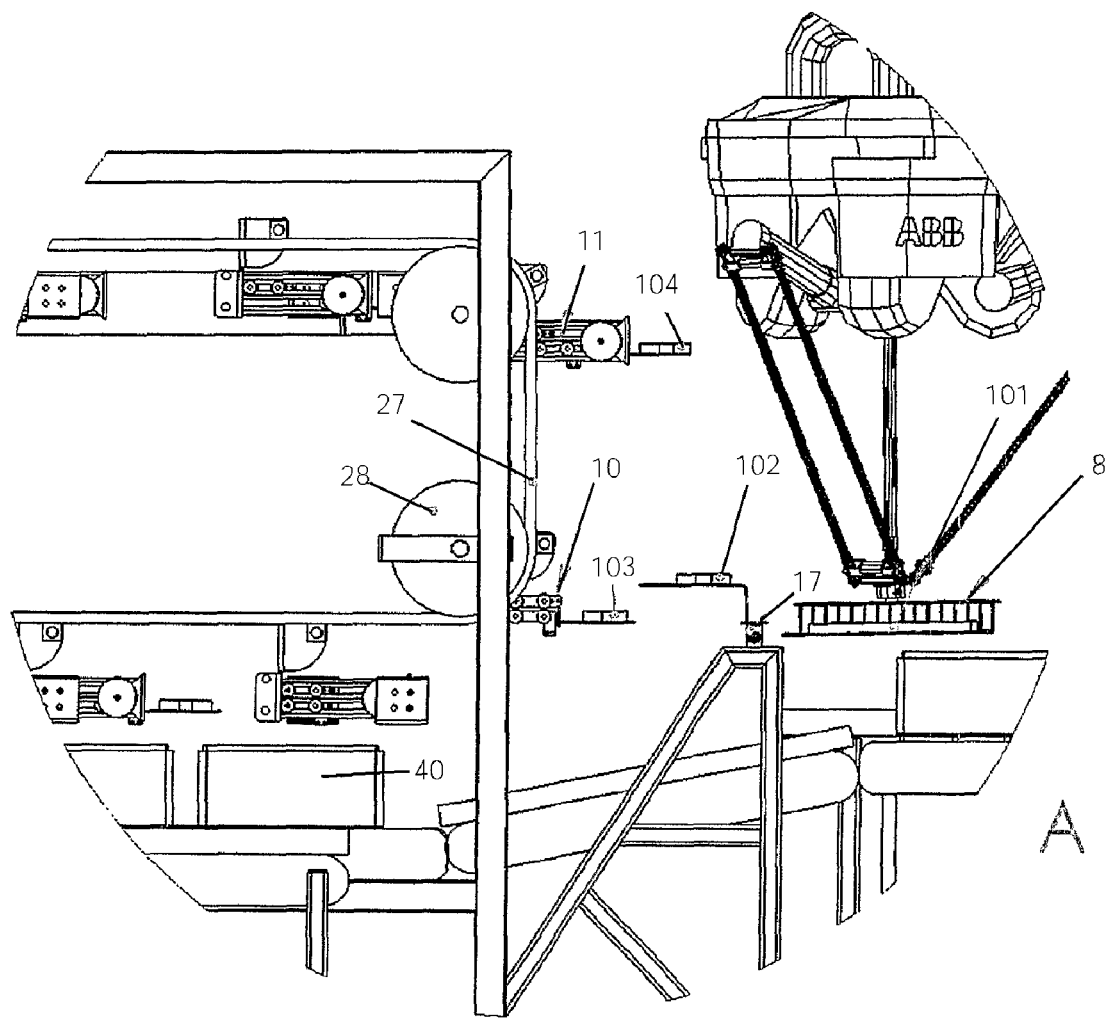

FIG. 4 shows a side view of the embodiment for clarification and FIG. 5. shows a detain view emphasizing how product is fed into the carousel 6. It should however been noted that some important components of the carousel have been removed in FIG. 5 for clarity purposes. In FIG. 5. the article holder at is in an extended position 11 and has just picked up the article 104 from the weighing means which is a rim-scale 3 sitting on a load-cell 17. Although there is an article 102 on the rim-scale it is not picked up by the article holder 10 approaching the rim-scale as the article holder is holding an article 103 which is to be re-circulated as it was not suitable for any of the containers 40-45 currently being filled. A driving wheel 28 for the driving belt 27 of the carousel is also shown on FIG. 5 which all the article holders are attached to.

In the carousel there can be various other features which are not shown on the drawings. For example a washing position where each article holder is washed when passing by the station, that would typically be done when the articles have been released. Another option is to enclose the carousel completely to be able to maintain the temperature of the articles during the batching process or even to cool the articles down or warm them up during the process. Yet another option is to have a re-arrangement location where the articles would be re-arranged if needed. This could be done for example by lifting the articles of the rims, rotate them a certain amount and release them again onto the same article holder or any of the subsequent article holders.

Figure 6A:
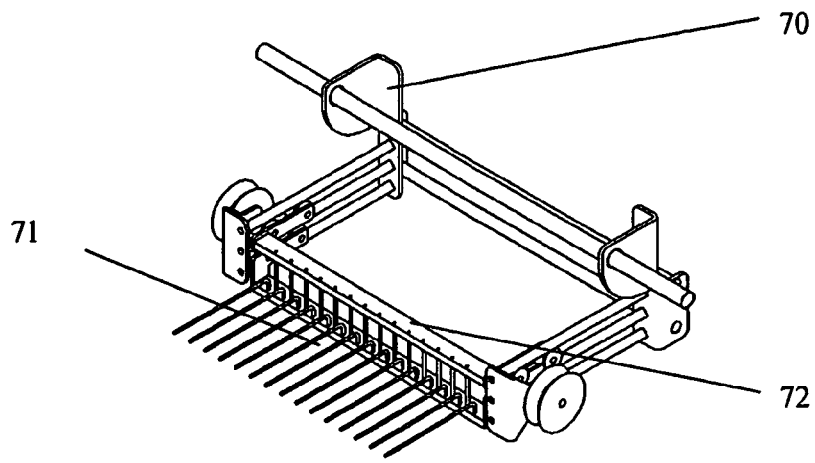
Figure 6B:
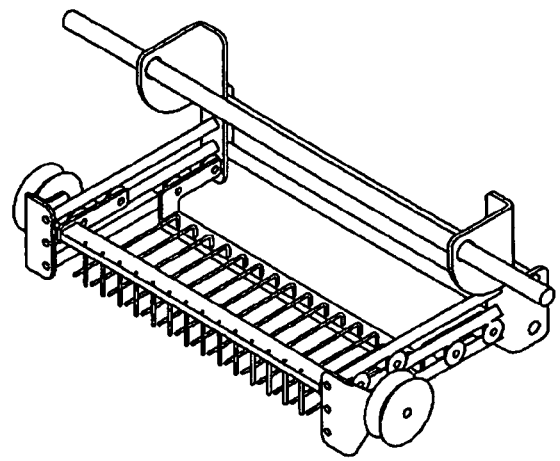
Figure 6C:
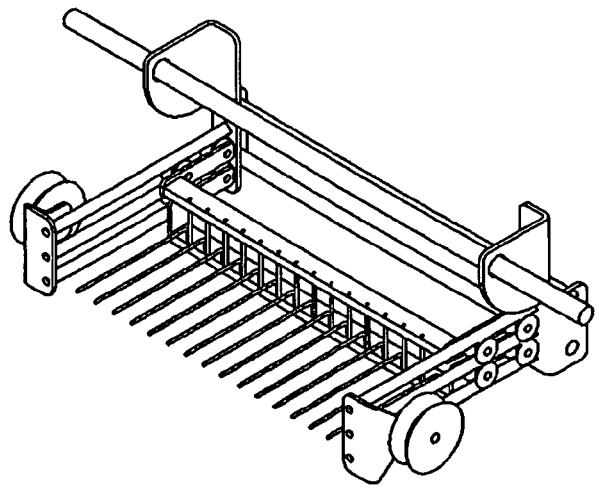

In FIG. 6. there are shown three configurations of an article holder 70. This article holder has two rim units 71, 72 which can be moved independently. The article holder will be placed in configuration shown in FIG. 6a when picking up the articles which will rest on rim unit 71. When a release of an article is needed the lower rim unit 71 is pushed back to the location shown in FIG. 6b when the article holder is at the correct location such that an article will enter the correct receive location. Finally in the configuration shown in FIG. 6c an article (not shown on figure) would typically be located in the lower rim unit 71 and it could pass the rim-scale without damaging the article or pick up an article which might be positioned at the rim-scale 3.

Figure 7:
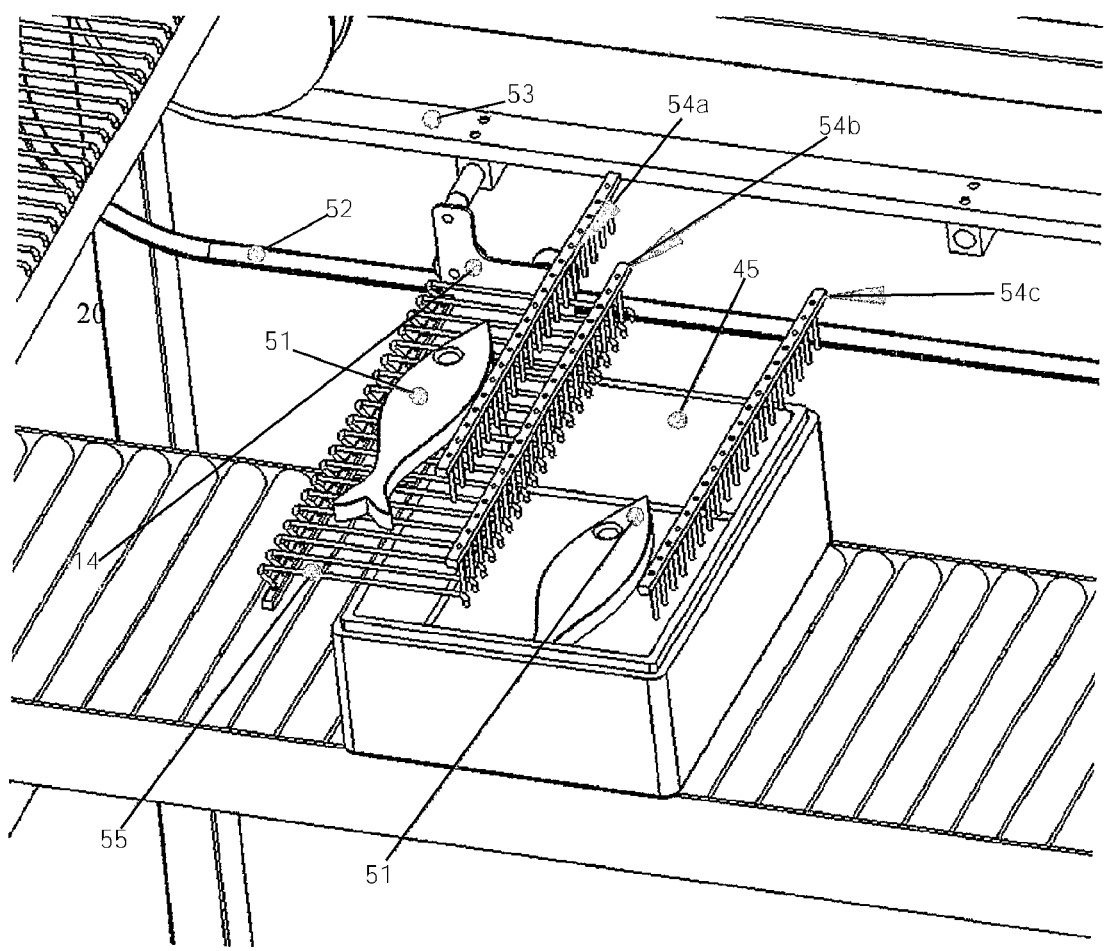

FIG. 7. shows another embodiment of the article holder (14). This article holder is fully static, that is has no moving parts. The rims (55) on the article holder are bent at the rare end such that articles can be pushed of the article holder 14 without interference with the support structure of the article holder. In FIG. 7 there is also shown a push-off rim 54a, 55b, 55c in three possible locations. For clarity purposes the driving mechanism for the push-off rim is not shown on the figure. If the rim is placed in the first location (54a) the article 51 sitting on the article holder 14 will not be pushed off and will then bypass the container (45). If it is has been lowered from that position directly downwards and is located at position labeled (54b) the article (51) will be pushed off into the container such that it will be located on the left hand side of the article (50) already in the container (45). If however the push-off rim unit is located at position (54c) the article (51c) will be pushed into the container (45) on the right hand side of article (50) as the article holder (51) moves with the carousel from left to right on FIG. 7. The support structure 52 under the article holder 14 will ensure that the article holder is always level and the article will therefore maintain its arrangement.

It should be noted that when the rim module is moving at high speed the article can be expected to fall directly into the container with the same side up while if the speed is somewhat slower the article can turn consistently 180 degrees around it longitudinal axis and lend upside down in the container. In these instances the robot 7 will place the articles upside-down on the rim-scale 3 such that the articles will end up in correct orientation in the containers 40-45. By controlling the relative speed between the push-off rim 54 and the article holder 14 as well as the height of the article holder above the receiving location it can be controlled how the article will be arranged in the container.

Figure 8:
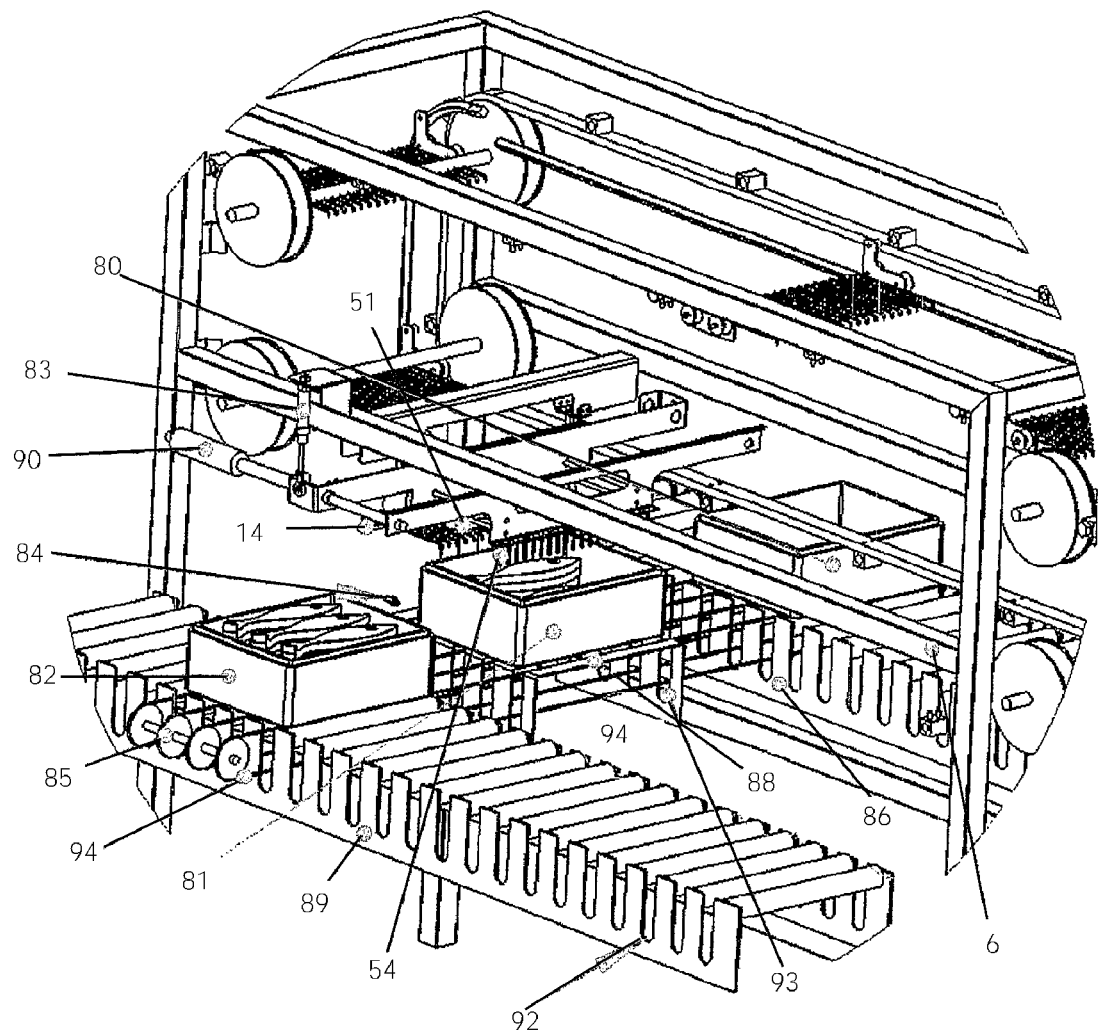

FIG. 8 shows an embodiment of the mechanism used for moving the push-off rims 54. The push off rim 54 is controlled with two independent actuators. One of the actuator 83 would typically be only two position actuator where in the upper position the articles 51 sitting on the article holder 14 would pass this receiver location. If however the actuator is extended, as it is on FIG. 8, the article 51 will be pushed of the article holder into the container 81. The other actuator 90 can however be accurately controlled by the control system to the precise location which will determine where in the container the article will be placed. Typically there is a motor and an encoder, these are embedded in the actuator housing, which ensure that the actuator is at the precise desired location. The distance the actuator can move the push-off rim 91 would typically be similar to the maximum width of the containers.

FIG. 8 shows as well as how containers 80, 81, 82 can be fed to and from the system. Empty containers are fed into the system on roller conveyor 86. When they have reach the desired discharge location from the carousel 6 they are stopped with an upwards moving plate (not shown on figure) or by stopping the roller conveyor 86. The roller conveyors 86, 89 are made with slots 92 between the rollers such that the cords 94 of the cord-conveyor 85 can fit into these slots. Between the two roller conveyors is a supporting slotted plate 88. The slots 88 in the plate will match with the slots 92 in the roller conveyors such that the cords 94 of the cord-conveyor 85 will fit between all the slots. Once the container 80 has been stopped at the correct location and if there is no container on the supporting plate 88 or if it has been completely filled with the desired objects, the cord-conveyor is lifted up with a lift up mechanism (not shown on figure) and the cord-conveyor ran until the empty container 80 is at the correct location under the carousel. That can be sensed with the sensor 84 or with some other means. Then the cord-conveyor is lowered again such that the container will rest on the supporting plate 88. At the same time if there was a full container resting on the supporting plate 88 it would have been transferred over to roller conveyor 89 which feed the containers to further processing, e.g. putting lids and placing the containers on pallets.

It can be beneficial in some cases, typically when many articles are to be placed in each container, to have the plate 88 on weighing means, typically a load-cell connected to a scale 94 which is then connected to the control system. This is practical when making containers of fixed target weight with minimum give-away. Sometimes the weight of empty containers wary and then the scale 94 is used to weigh the empty container as it has been placed on the weighing platform, that is the supporting plate 88, such that the containers weight can be precisely determined. Then subsequently the weight of the container is continuously recorded and reported to the control system as the articles enter into the container. These records are then used by the control system to correct the weight estimate of container which was based on the measurement obtained previously of each article or group of articles. For example there could be three pieces which will have been placed in the container and there weight estimate was, 100.2 g, 202.2 g and 303.2 g. If there where no weighing means for the container the control system would assume that the weight in the container is the sum of the articles, that is 605.6 g. If now the scale 94 would weigh the articles in the container to be 605.0 g instead of the 605.6 g the weight would be corrected in the control system and the decision for the placement of subsequent articles in the container, or other containers would be based on this measurement. It can also be beneficial to be able to check the weight of the container after the final article has been placed in each container as it must commonly be guaranteed to the buyer of food products that the minimum weight has been reached. By check-weighing directly under the carousel it is possible to add more articles if it happens that the container is under the desired minimum target weight after the final article has been placed in the container.

Although there is only shown one support plate 88 and one scale 94 there would typically be such devices at multiple receiver locations which can be of any number.

In an embodiment there can be multiple articles on the articles holders and there are multiple push-off rims for each article holder above each receiving location and it can thus be controlled which of the articles in the article holders are released into the containers.

Although we have primarily focused the embodiments on filling up containers it also possible that the receiving location is a conveyor or even another carousel unit of the same type as here described.

In an embodiment the carousel conveyor can be fed directly with the robot arm (7) or even manually.

EXAMPLE

Let us assume that we are making a 3000 g packs with minimum give-away. Let us also assume that the weight of the articles which come on the in-feed conveyor come in the order shown and that their weights are as follows:

| Num | Wgt(g) |
| --- | --- |
| 1 | 539 |
| 2 | 546 |
| 3 | 455 |
| 4 | 475 |
| 5 | 450 |
| 6 | 538 |
| 7 | 530 |
| 8 | 548 |
| 9 | 495 |
| 10 | 489 |
| 11 | 486 |
| 12 | 533 |
| 13 | 499 |
| 14 | 539 |
| 15 | 535 |
| 16 | 522 |
| 17 | 506 |
| 18 | 458 |
| 19 | 466 |
| 20 | 474 |
| 21 | 541 |
| 22 | 492 |
| 23 | 545 |
| 24 | 474 |
| 25 | 529 |
| 26 | 486 |
| 27 | 490 |
| 28 | 483 |
| 29 | 549 |
| 30 | 460 |

Let us assume that the carousel has 14 buffers and that the first 14 articles are placed in the carousel. The average weight in the carousel will then be 509 g and let us also assume that it is desired to use two articles on average to finish the batch. Then the target weight of the first box will be: 3000−2× 509=1982 g. To maximize the chances of getting the final weight of the container close to the target a prospective graph can be constructed for each container at the pre-filling location. The articles will then be placed in container 20 if the new value obtained from the prospect function for that container is higher than a preset threshold value but to otherwise it will be placed in the second container (21) or any of the subsequent containers. Let us assume that this method results in placing the first 4 articles numbered 15-18 in the table above into the first container. Once the articles have been placed properly in the container by the robot arm the system waits for a steady weight from the static scale (30) on the container (20). Assuming that the vision system would estimate the articles with perfect accuracy the weight would not change and would in this case therefore be 2021 g. The remaining weight is therefore 979 g. Now the container will be taken off the scale and moved on the roller conveyor of the static scale (30) to the transfer conveyor (12) and from there on to the roller conveyor (13) to the final release station furthest away from the scale where a container numbered (45) is located. By evaluating all the possible combination of the weights in the carousel we will find that minimum giveaway is obtained by using weights no. 5 and no. 7, that is 450 g+530 g=980 g which will result in a total batch weight of 3001 g. Before the first container 20 has been completed filled from the carousel the next box could be filled which would then be moved to the second filling station.

In some instances where few articles are in each batch it will not be necessary to place any articles directly in the containers and the robot 7 will then feed all the articles directly onto the rim scale 3 and all the articles will then be taken off the carousel and placed in the containers.

When handling extremely sticky products it might not work properly to push the articles of the rim module in the carousel. In these instances it will be necessary to lift the articles off the carousel rims and that can be done with one of several methods. One is to rotate the rim module in the middle of the carousel and then use a robot with a rim gripper to take selected articles off from the other end of the carousel.

Other Embodiments

Another method to solve the same task with the same carousel and the same rim scale is shown in FIG. 4. The same robot arm could be used to feed the rim scale but then two rim scales would be used as all the articles will be weighed on rim scales. Another option would be to use a conveyor with retractable out-feed end is used to feed the product onto each rim scale. The articles will then be selectively be removed from the carousel on the take-away conveyor in such an order that the first required number of articles to make the correct weight in the first container will go first on the take-away conveyor. A robot arm will then take the articles of the take-away conveyor and place them properly into the containers. To improve the accuracy it is possible to let the robot arm fill multiple containers at the same time. In this case the carousel would act purely as a reordering system for the articles.

Figure 9:
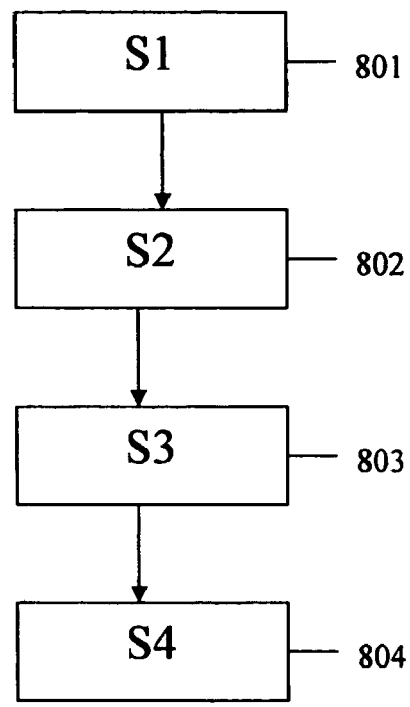
FIG. 9 shows one embodiment of a method according to the present invention of grading articles based on at least one characteristics of the articles.

FIG. 9 shows one embodiment of a method according to the present invention of grading articles based on at least one characteristics of the articles, wherein the grading comprises building up portions of the articles in containers or grading the articles onto one or more receiving areas, wherein the arrangement of the articles during the grading is preserved. Initially (S1) 801 one or more characteristic parameters indicating the characteristics of the articles is determined. This can e.g. comprise the weight of the article, the color, the shape, the type etc. Ether prior or subsequent to the step of determining the characteristics of the articles, the articles are conveyed (S2) 802 along a closed-loop conveying path, wherein the conveyor comprises a number of article holders attached to the conveyor for holding the articles during the conveying along the closed-loop conveying path. The article are during the conveying resting or being hold by article holders. These holders are adapted to preserve the arrangement of the articles in the article holders during the conveying. The one or more characteristic parameters are used (S3) 803 for selecting article holders that is suitable for the grading is then selected. E.g. the article is a fish separated into three articles, the characteristic parameters indicate which part is the head, central and tail part. One of the receiving areas may e.g. be a take-away conveyor that is adapted to convey only the tail part (e.g. to a freezer). Accordingly, the article holders that have the tail parts are those who release the articles onto the take-away conveyor. It should however be noted that one and the same article holder may hold all the three different parts. Finally (S4) 804, the articles are removed from the article holders in the containers or to the one or more receiving areas, without altering the arrangement of the articles in the article holders.

Figure 10:
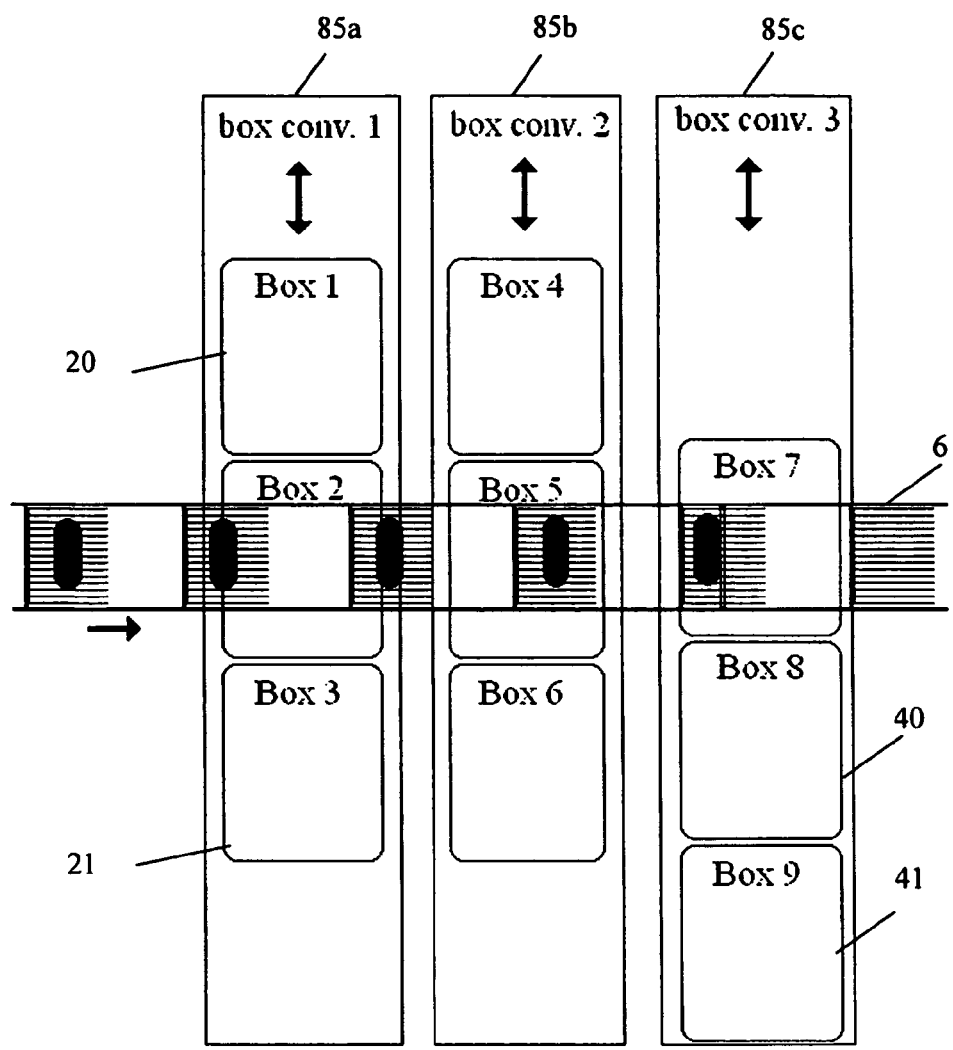
FIG. 10 shows an embodiment of at least second conveyor.

FIG. 10 shows an embodiment of said at least second conveyor 85, where the said at least second conveyor comprises three conveyors 85*a-c* that are adapted to move in forward and backward direction substantially perpendicular to the conveying path of the first conveyor 6, wherein the conveyors 85*a-c* are further adapted to control the position of the containers 20, 21, 40, 41 during building up the portions of the articles in containers.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with preferred embodiments, it is not intended to be limited to the specific form set forth herein. Rather, the scope of the present invention is limited only by the accompanying claims.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. An apparatus for grading food articles based on at least one characteristics of the food articles, wherein the grading comprises building up portions of the food articles in containers where the portions are based on at least one characteristics, comprising:
   determining means for determining one or more characteristic parameters indicating the characteristics of the food articles,
   first conveyor for conveying the food articles along a closed-loop conveying path, the conveyor comprising a number of article holders attached to the conveyor for holding the food articles during the conveying along the closed-loop conveying path,
   arranging means for arranging the food articles onto the article holders, the article holders being adapted to preserve the arrangement of the food articles in the article holders during the conveying, said characteristic parameters including data indicating the initial arrangement of the articles in the article holders,
   a processor for determining to which container a food article selected from said food articles in the article holders is to be fed based on the one or more characteristic parameters including said data indicating the initial arrangement of the articles in the article holders, and
   a container filling station controlling the removing of the food articles from the article holders determined by the processor to pre-fixed locations in the containers and thus control the location of the articles in the containers by using said characteristic parameters including said data indicating the initial arrangement of the articles in the article holders.

2. The apparatus according to claim 1, wherein the determining means comprises a weight determining means, and wherein the characteristic parameters indicating the characteristics of the food articles is the weight of the food articles.

3. The apparatus according to claim 1, wherein the arranging means is further adapted to arrange a part of the food articles directly into the containers prior to the release of the food articles from the food articles holders into the containers.

4. The apparatus according to claim 1, wherein the arranging means comprises one or more robotic systems.

5. The apparatus according to claim 1, wherein the first conveyor comprises one or more carousel conveyors.

6. The apparatus according to claim 5, wherein the carousel conveyor is situated vertically in relation to the in-feed conveyor rotating along a circular path with rotational axis being substantially in the horizontal plane as the in-feed conveyor.

7. The apparatus according to claim 1, further comprising an in-feed conveyor for in-feeding the food articles.

8. The apparatus according to claim 1, further comprising a second conveyor for conveying the containers during building up the portions, the second conveyor comprising a first filling conveying section arranged below the first conveyor where the releasing of the food articles from the article holders into the containers takes place.

9. The apparatus according to claim 8, wherein the second conveyor further comprises an encoder for keeping track of the position of the containers.

10. The apparatus according to claim 8, wherein the second conveyor further comprises a second filling conveying section where arranging a part of the food articles directly into the containers prior to the release of the food articles from the food articles holders into the containers takes place.

11. The apparatus according to claim or 8, wherein the second conveyor is adapted to move in forward and backward direction substantially perpendicular to the conveying path of the first conveyor, the second conveyor comprises an encoder for keeping track of the position of the containers and control the position of the containers during building up portions of the articles in the containers so as to control the positions of the articles in the containers and control which containers at each time should receive the articles from said removing means.

12. The apparatus according to claim 11, wherein at least one second conveyor comprise a receiving end for receiving empty or partly filled containers and a returning end for returning filled up containers, wherein the sequence of filling up the containers is such that those containers the facing the returning end are those where the portions are first build up.

13. The apparatus according to claim 1, further comprising an in-feed conveyor for conveying incoming food articles prior to the weighing.

14. The apparatus according to claim 1, wherein the removing means comprises an angular variation mechanism associated to each respective article holders, wherein the removing comprises altering the angular position of the article holder resulting in a sliding of the food articles from the article holders into the containers.

15. An apparatus according to claim 1, wherein the removing means comprises a robotic system or food articles release robotic system.

16. The apparatus according to claim 1, further comprising a weighing means for weighing each of the containers prior to building up weight determined portions of the food articles of a final weight limit in the containers, wherein the result of the weighing by the weighing means is used as an reference or zero weight limit for each of the weight determined portions, wherein during building up the weight determined portions in each of the containers the total weight of each of the portions is frequently measured by the weighing means and compared to the sum up weight of each of the food articles in each of the containers, wherein building up each of the portions comprises releasing the food articles into the containers until the total weight of each of the portions has reached final weight limit.

17. An apparatus for grading food articles based on at least one characteristics of the food articles, wherein the grading comprises building up portions of the food articles in containers where the portions are based on at least one characteristics, comprising:
   determining means for determining one or more characteristic parameters indicating the characteristics of the food articles,
   first conveyor for conveying the food articles along a closed-loop conveying path, the conveyor comprising a number of article holders attached to the conveyor for holding the food articles during the conveying along the closed-loop conveying path,
   arranging means for arranging the food articles onto the article holders, the article holders being adapted to preserve the arrangement of the food articles in the article holders during the conveying, said characteristic parameters including data indicating indicating the initial arrangement of the articles in the article holders,
   a processor for determining to which container a food article selected from said food article holders is to be fed based on the one or more characteristic parameters including said data indicating the initial arrangement of the articles in the article holders, and
   a container filling station removing means for controlling the removing of the food articles from the article holders determined by the processor to pre-fixed locations in the containers and thus control the location of the articles in the containers by using said characteristic parameters including said data indicating the initial arrangement of the articles-in the article holders;

wherein the determining means comprises a weight determining means, and wherein the characteristic parameters indicating the characteristics of the food articles is the weight of the food articles;

wherein the weight determining means is a grid-scale comprising a number of substantially horizontally and parallel extending rods arranged in an overlapping position to the closed-loop conveying path of the first conveyor.

18. An apparatus for grading food articles based on at least one characteristics of the food articles, wherein the grading comprises building up portions of the food articles in containers where the portions are based on at least one characteristics, comprising:

determining means for determining one or more characteristic parameters indicating the characteristics of the food articles, first conveyor for conveying the food articles along a closed-loop conveying path, the conveyor comprising a number of article holders attached to the conveyor for holding the food articles during the conveying along the closed-loop conveying path, arranging means for arranging the food articles onto the article holders, the article holders being adapted to preserve the arrangement of the food articles in the article holders during the conveying, said characteristic parameters including data indicating indicating the initial arrangement of the articles in the article holders, a processor for determining to which container a food article selected from said food article holders is to be fed based on the one or more characteristic parameters including said data indicating the initial arrangement of the articles in the article holders, and a container filling station removing means for controlling the removing of the food articles from the article holders determined by the processor to pre-fixed locations in the containers and thus control the location of the articles in the containers by using said characteristic parameters including said data indicating the initial arrangement of the articles-in the article holders;

wherein the determining means comprises a weight determining means, and wherein the characteristic parameters indicating the characteristics of the food articles is the weight of the food articles;

wherein the article holders comprise shovel-shaped grids comprising a number of substantially horizontally and parallel extending rods, wherein in an overlap position between the grid-scale and the shovel shaped grids the rods of the shovel-shaped grids fall within the space between two adjacent rods in the grid-scale, thereby enabling the shovel-shaped grids when approaching the grid-scale from below to go through the grid-scale.

19. The apparatus according to claim 18, wherein the article holders are further associated to a displacement mechanism for enabling side-wise displacement of each holder in relation to the closed-loop conveying path.

20. A method of grading food articles based on at least one characteristics of the food articles, wherein the grading comprises building up portions of the food articles in containers where the portions are based on at least one characteristics, comprising:

determining one or more characteristic parameters indicating the characteristics of the food articles, conveying the food articles along a closed-loop conveying path, the conveyor comprising a number of article holders attached to the conveyor for holding the food articles during the conveying along the closed-loop conveying path, arranging the food articles onto the article holders, the article holders being adapted to preserve the arrangement of the food articles in the article holders during the conveying, said characteristic parameters including data indicating the initial arrangement of the articles in the article holders, determining to which container a food article selected from said food articles in the article holders is to be fed based on the one or more characteristic parameters including said data indicating the initial arrangement of the articles in the article holders, and controlling the releasing of the food articles from the selected article holders to pre-fixed locations in the containers and thus control the location of the articles in the containers by using said characteristic parameters including said data indicating the initial arrangement of the articles in the article holders.

21. The method according to claim 20, wherein determining one or more characteristic parameters comprises determining the weight of the food articles and wherein the portions comprise weight-determined portions, the method further comprising arranging the food articles directly into the containers up to a first weight limit and subsequently conveying the containers towards the conveyer where the releasing from the article holders into the containers takes place until a final weight limit is reached.

22. The method according to claim 21, wherein the first weight limit is selected so that the difference between the weight-determined portions and the final weight limit corresponds substantially to an integer multiplication of an average weight of each individual article.

23. The method according to claim 21, wherein the portions comprise two or more different types of food articles or two or more different weight portions.

24. The method according to claim 20, wherein controlling the arrangement of the food articles comprises preserving the initial plane direction and the initial orientation of the food articles from where the food articles are arranged in a pre-defined way onto the article holders until the food articles have been released into containers or to the one or more receiving areas.

25. The method according to claim 20, wherein the food articles are arranged automatically onto the article holders.

26. The method according to claim 20, wherein the step of removing the food articles from the article holders into containers without altering the arrangement of the food articles in the article holders is performed by altering the initial angle position of the article holders until the food articles slide therefrom to the containers.

27. The method according to claim 20, wherein the step of removing the food articles from the food articles holders into the containers without altering the arrangement of the food articles in the article holders is performed by removing the food articles automatically therefrom to the containers.

* * * * *

UNITED STATES PATENT AND TRADEMARK OFFICE
CERTIFICATE OF CORRECTION

| | | |
|---|---|---|
| PATENT NO. | : 7,967,149 B2 | Page 1 of 1 |
| APPLICATION NO. | : 12/161863 | |
| DATED | : June 28, 2011 | |
| INVENTOR(S) | : Hjalmarsson Helgi | |

It is certified that error appears in the above-identified patent and that said Letters Patent is hereby corrected as shown below:

Column 16, Line 25, Claim 15:

After "system or" insert -- a --.

Column 16, Line 31, Claim 16:

After "used as" insert -- a --.

Column 16, Line 58, Claim 17:

Delete "indicating" (second occurrence).

Column 17, Line 32, Claim 18:

Delete "indicating" (second occurrence).

Signed and Sealed this
Tenth Day of April, 2012

David J. Kappos
*Director of the United States Patent and Trademark Office*